Patented Oct. 29, 1935

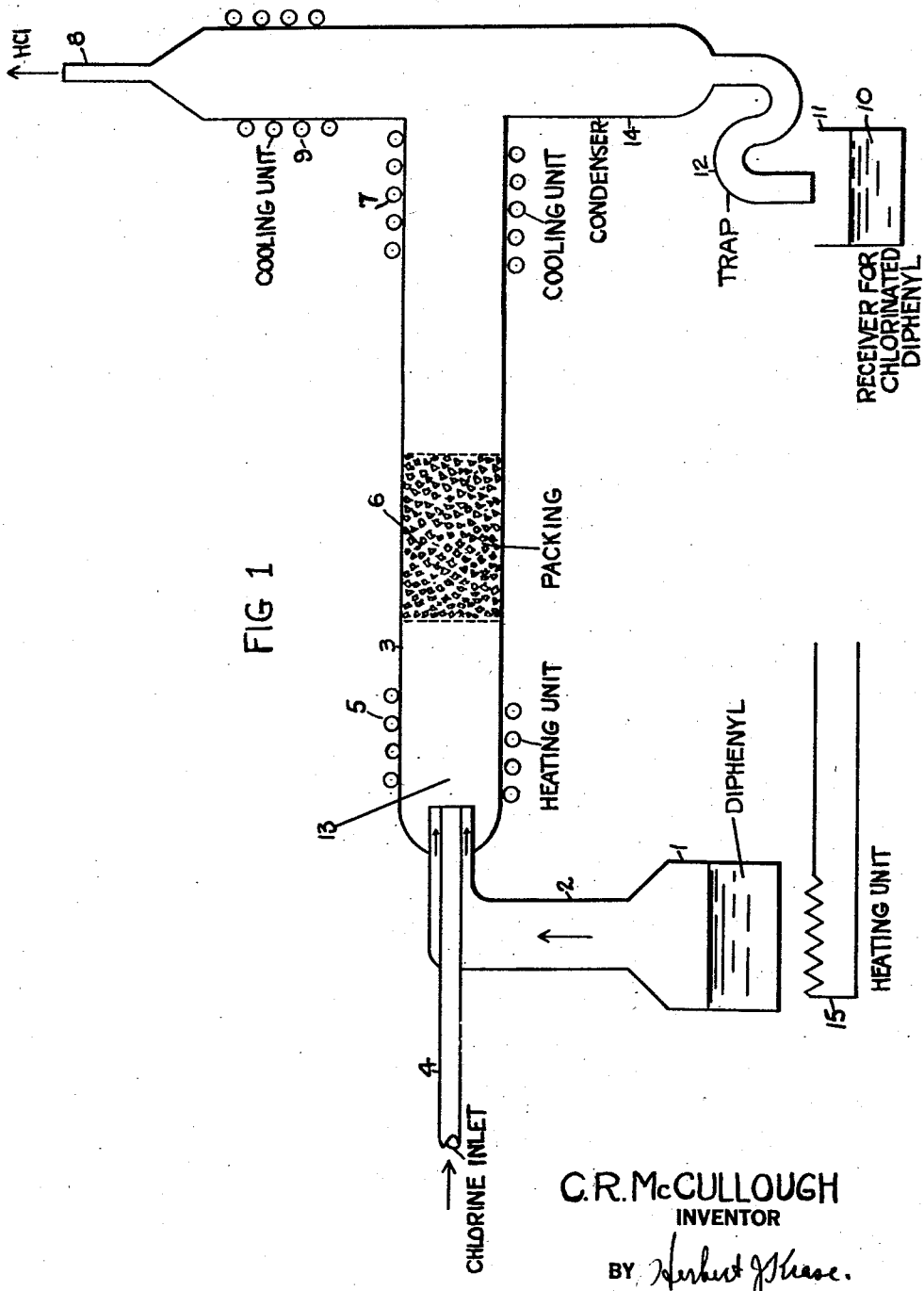

2,019,015

UNITED STATES PATENT OFFICE 2,019,015

HALOGENATION OF DIPHENYL

Campbell R. McCullough, Anniston, Ala., assignor to Swann Research, Incorporated, a corporation of Alabama Application November 11, 1933, Serial No. 697,552

10 Claims. (Cl. 260—161)

This invention relates to the halogenation of diphenyl. One object of this invention is the provision of a process by which diphenyl may be halogenated under conditions susceptible of accurate control. A further object is the provision of a process by which the customary distillation procedure is made unnecessary when it is desired to produce a light-colored halogenation product of diphenyl.

As a result of the control which I am able to maintain over the course of reaction, I am enabled to produce either the low halogenated diphenyls or the higher halogenated bodies, by a simple change in the proportions of the reacting ingredients. I am also enabled to produce the higher halogenated bodies by reacting additional halogen with the lower halogenated diphenyls under conditions of accurate control.

Previous methods for the production of halogenated diphenyl bodies have involved the reaction of a gaseous halogen with liquid or dissolved diphenyl. Such a reaction is usually accelerated by the use of catalysts which may be the common halogenation catalysts. In cases where chlorination of diphenyl is being carried out, I may use chlorination catalysts such as iron, iodine, sulfur, antimony, etc. In the cases where fluorination, bromination or iodination are being carried out, I may employ the respective catalysts for accelerating such reactions. When iron, for example, is present during such reaction, between liquid or dissolved diphenyl and chlorine, the reaction product rapidly becomes dark in color, and even very black. In the cases where iodine is employed as a chlorination catalyst, and the reaction is carried out in the absence of iron, as in glass or ceramic vessels, the product becomes rather dark in color, which becomes deeper as the chlorination proceeds. When the clear uncolored, or only slightly yellow products are desired, it becomes necessary to subject the colored material to a distillation process, which is somewhat expensive and results in a lowered yield.

I have now discovered that if diphenyl be first vaporized and the vapor then reacted with halogen vapor, a reaction may be effected between the two at temperatures below the combustion point of diphenyl in the halogen. I may induce the reaction between the vaporized diphenyl and the halogen by various means, such as by the heating of the mixed vapors, passing the mixed vapors over catalytic bodies, or by a combination of heat and catalysis. In some cases I may conveniently heat the halogen gas before mixing with the diphenyl vapor; in other cases the diphenyl vapor alone may be heated before mixing. By any of these means heat may be introduced into the mixed vapors in the amount required to start the reaction.

An important feature of my invention is that heating must not be carried to the point where flaming occurs. Such flaming is caused by an acceleration of the reaction beyond the halogenation point, and the result of such a reaction is to completely decompose the hydrocarbon. The products of such decomposition are invariably carbon and a hydrogen halide, free halogen possibly, and other high temperature decomposition products. Such a reaction may be manifested by a visible flame and when it occurs it is evidence of too high a temperature or too low a velocity of the reacting vapors. The remedy for such a condition is to lower the reaction temperature of the mixture by withdrawal of heat from the vapors.

A specific example of the application of my invention is the production of chlorinated diphenyl by the reaction of vaporized diphenyl and chlorine gas. When operating according to this invention, the diphenyl is vaporized by the application of heat and the diphenyl vapor, above or at its boiling point, is mixed with chlorine gas. Since the reaction may be practically complete, by proportioning the reacting vapors any desired degree of chlorination of the diphenyl may be obtained. The mixed vapors of diphenyl and chlorine are passed into a reaction chamber which is preferably filled with packing material, which may or may not have catalytic properties, and the temperature is brought to the point where the chlorination reaction is initiated. The correct conditions are had when hydrochloric acid fumes are liberated from the reaction chamber. The product which may range from a light oil through a more viscous liquid which may become a crystalline body on cooling, is separated from the reacting chamber by gravity flow from the lower part of such chamber.

Such a chlorination reaction in the vapor phase may be carried on in a uniform manner by regulation of the heat input and output to the reaction chamber. As mentioned above, if the temperature of such chamber becomes too high, an orange-colored flame becomes visible and carbon is formed from the hydrocarbon. If this takes place, it is indicative of too high a reaction temperature or too low a velocity of the vapors, or both. This may be then remedied by the withdrawal of heat from the reaction mixture or by an increase in vapor velocity, or both. If sufficient heat is withdrawn, the normal chlorination reaction will again take place. The product obtained on normal chlorination is light yellow colored liquid, the viscosity of which depends upon the degree of chlorination of the diphenyl.

The temperature effective to bring about chlorination of the diphenyl is necessarily a variable one, depending upon the degree of chlorination desired and the proportions of the reacting ingredients. At all events it can be said to be between the normal boiling point of diphenyl (254° C.) and at moderate velocities, just short of the temperature at which the flame appears in the reaction zone (decomposition temperature). Since the latter point is easily recognized, it should afford no difficulty in carrying out my invention.

It should also be made clear that the temperature of a stream of chlorine gas and diphenyl, reacting at the chlorination temperature, will be maintained constant, after a steady state has set in, by the abstraction of heat from the vapors. Where a large volume of such vapors is reacting, a considerable amount of heat will be carried out by the gaseous products of the reaction (HCl gas); some will serve to heat the incoming reactants, while the remainder will be abstracted through the walls of the reaction chamber. Cooling devices may be necessary to remove the heat in large installations.

I may also, if desirable, employ an inert gas, for example, nitrogen or carbon dioxide mixed with the chlorine gas, or introduced separately. For many purposes an impure chlorine gas, such as cell gas, may be used for chlorination, the inert non-reactive gas serving to remove heat from the reaction zone. Such inert gas will further raise the temperature at which the decomposition reaction takes place, making the operation as a whole more easily controllable.

A preferred means for carrying out my process is illustrated in the accompanying drawing, showing in diagrammatic form a type of apparatus satisfactory for the purpose.

In the drawing, 1 is a container in which diphenyl may be boiled; 2 is a tube connecting said container with the reaction tube 3; 4 is a chlorine inlet tube; 5 is a heating means, an electrical heating coil wound upon the tube being shown. Other heating means may, of course, be employed if more convenient. The reaction tube 3 contains a packing material 6 which, if desirable may have catalytic properties. A cooling unit is 7. The gaseous products of the reaction may be vented at the point 8 and disposed of in the usual way. Another cooling unit is 9. The product 10 is collected in the receiver 11. The rate of vaporization of the diphenyl in the flask 1 is controlled by the degree of heat supplied by heating unit 15. A trap 12 is provided for separating the liquid and gaseous products of reaction.

The operation of my process will now be explained. Diphenyl is boiled in the flask 1 by means of the heater 15, the vapors rising upwardly and passing into reaction tube 3 by means of tube 2. Chlorine gas at the desired rate is supplied by inlet tube 4 from a source not shown. Intermingling of the vaporized diphenyl and chlorine takes place at the point 13, and reaction commences. Heat is supplied to the reaction chamber 3 by means of heating coil 5, which heat causes a combination of the intermingled diphenyl vapor and chlorine, such combination taking place in the reaction space, both before the packing material and in the interstices between such material. Collection of the liquid product of the reaction occurs on the walls of the reaction vessel in the vicinity of the cooling element 7 and in the condenser 14, which is provided at the upper extremity with cooler 9. The liquid product then flows downwardly and is discharged from the condenser 14 by means of the trap 12. The packing material functions to effectively mix the vaporized diphenyl and the chlorine gas to cause a more uniform chlorination to take place. It may also function as a catalytic body for the same purpose, as above pointed out.

By means of the apparatus shown, I may obtain high velocities of the reacting vapors, which velocities may be higher than the rate of flame propagation. By such means as this I am enabled to carry out chlorination to any desired degree by suitable proportioning of the reacting ingredients, and without destruction of the diphenyl by excessively high temperatures.

The precise position in the reaction zone of the heating unit 5, the packing material 6, and the cooling unit 7 may, of course, be varied to suit the dimensions of the apparatus and the rate and extent of chlorination of the diphenyl. By reference to the description of the process, it will readily be apparent to one skilled in the art as to how these units are to be positioned for satisfactory operation.

A further control over the rapidity and extent of the reaction may be obtained by operating under super-atmospheric or even sub-atmospheric pressures. Since a super-atmospheric pressure will increase the boiling point of dipenyl, the diphenyl vapor may be introduced into the chlorine atmosphere at a higher temperature than when at atmospheric pressure, and initiation of the reaction may be made to take place spontaneously or with only a small amount of added heat. The reverse will be true at sub-atmospheric pressures.

In the above-given example I have specifically described my invention as applied to the chlorination of diphenyl, this being one of the most useful applications of my invention. It may, however, be applied to the other halogenation reactions, in similar manner, due cognizance being taken of the somewhat varying properties of the other halogens.

I may also, by means of my invention, produce the higher halogenated diphenyls by reaction of the lower halogenated diphenyls and additional halogen. The halogen with which the halogenated diphenyl is to be reacted may be the same one which has already partly reacted with the diphenyl, or it may be a different one. I may in this manner produce more highly halogenated compounds from those containing smaller quantities of halogen, or I may produce halogenated compounds in which two or more different halogens are substituted in the same diphenyl nucleus. A specific application of such a variation in my process is in the production of higher chloro compounds from lower chloro diphenyls, particularly those in which the diphenyl nucleus contains one, two, three or more chloro groups. I may also, by the same means, chlorinate a brominated diphenyl or brominate a chloro diphenyl.

The conditions for such a reaction and the behavior thereof are much the same as that described above for diphenyl. The reaction temperature, instead of ranging upwardly from the boiling point of diphenyl, may range upwardly from that of the normal boiling point of the particular halogenated diphenyl to somewhat below that at which decomposition of the hydrocarbon nucleus takes place. This latter temperature will vary somewhat with the degree of halogenation achieved and the type of halogen which has been substituted. It is hence impossible to more accurately fix a definite upper temperature.

The apparatus described and shown appears to be somewhat in the nature of laboratory apparatus. I have, however, successfully carried the invention out in such simple equipment. The construction of large scale equipment for the present invention hence merely involves the design and construction of suitable equipment and does not change the principle of my invention.

Having now described one embodiment of my invention, it will readily be apparent to those skilled in the art that it is not so limited, but is susceptible of various changes and modifications without departing from the spirit thereof; and I desire, therefore, that only such limitations shall be placed thereupon as are imposed by the prior art or as are specifically set forth in the appended claims.

What I claim is:—

1. The process of chlorinating diphenyl comprising mixing together diphenyl vapor and a gaseous halogen and heating the mixture at a temperature ranging upwardly from the boiling point of diphenyl to a temperature just below that at which a flaming reaction occurs.

2. The process of halogenating a lower halo-diphenyl comprising reacting together a halo-diphenyl vapor and a gaseous halogen.

3. The process of halogenating a lower halo-diphenyl comprising reacting together halo-diphenyl vapor and a gaseous halogen in the presence of a halogenation catalyst.

4. The process of chlorinating a lower halo-diphenyl comprising reacting together halo-diphenyl vapor and gaseous chlorine.

5. The process of halogenating a lower halo-diphenyl comprising reacting together halo-diphenyl vapor and a gaseous halogen at a temperature ranging upwardly from the boiling point of said halo-diphenyl to a temperature just below that at which decomposition of the hydrocarbon nucleus occurs.

6. The process of chlorinating diphenyl comprising reacting together diphenyl vapor and chlorine at the chlorination temperature thereo, and maintaining said temperature by the abstraction of heat from the reacting vapors.

7. The process of chlorinating diphenyl comprising mixing together a stream of diphenyl vapor and chlorine gas, heating the mixture thereof to the chlorination temperature and maintaining said temperature by the abstraction of heat from the reacting vapors.

8. The process of chlorinating diphenyl comprising reacting together diphenyl vapor and gaseous chlorine in the presence of an inert gas.

9. The process of chlorinating diphenyl which comprises reacting together diphenyl vapor and chlorine in a reaction zone, the velocities of said vapors being sufficient to prevent destructive reactions from taking place in the said reaction zone.

10. The process of halogenating diphenyl comprising mixing together diphenyl vapor and a gaseous halogen and heating to a temperature ranging upwardly from the boiling point of diphenyl to a temperature just below that at which a flaming reaction occurs.

CAMPBELL R. McCULLOUGH.